Jan. 16, 1968  C. B. COLLINS ET AL  3,364,376

IODINE CYCLE INCANDESCENT LAMP INCLUDING CARBON MONOXIDE

Filed Sept. 21, 1965

Inventors:
Clifford B. Collins
Richard H. Holcomb
by Otto Tichy
Their Attorney

United States Patent Office 3,364,376
Patented Jan. 16, 1968

3,364,376
IODINE CYCLE INCANDESCENT LAMP INCLUDING CARBON MONOXIDE
Clifford B. Collins, Cleveland Heights, and Richard H. Holcomb, South Euclid, Ohio, assignors to General Electric Company, a corporation of New York
Filed Sept. 21, 1965, Ser. No. 488,840
1 Claim. (Cl. 313—222)

This invention relates generally to electric incandescent lamps comprising a tungsten filament sealed in a bulb or envelope of light pervious material containing a filling of inert gas, and more particularly to so-called iodine-cycle lamps which contain a small amount of iodine vapor which functions as a regenerative getter returning vaporized tungsten from the envelope wall to the filament, in accordance with the teachings of Patent 2,883,571 to Fridrich and Wiley, which is assigned to the same assignee as the present application.

It is an object of the present invention to provide an improved lamp and method of manufacture which will provide increased assurance of uniformity of operation of such lamp for a long useful life at high luminous efficiency and high maintenance of light output throughout life. It is a further object to provide a source of oxygen in such lamp sufficient to permit the most efficient operation of the tungsten-iodine cycle but not enough to shorten life by attacks of the tungsten filament.

In accordance with an aspect of the invention, the objectives are achieved by providing the lamp with a small but critical amount of carbon monoxide which is correlated with the pressure of the fill gas to achieve both long life and freedom from blackening.

For a further understanding of the invention, reference is directed to the following detailed description taken in conjunction with the drawing wherein.

The life of any incandescent lamp is controlled by the rate of loss of tungsten from the filament by evaporation because of the high temperature of the filament. While the vapor pressure at any temperature cannot be changed, the rate of evaporation can be substantially reduced by a filling of inert gas such as nitrogen, argon, krypton, xenon or mixtures thereof. The life of the iodine-cycle lamp is a function of pressure, with an increase in life of the order of six times being achieved in going from about 600 to about 4000 mm. Hg fill gas pressure. Part of the increase in life is due to the return of vaporized tungsten to the filament by the tungsten-iodine cycle. In practical lamp production there are other problems which limit useful life. Under certain circumstances the tungsten-iodine cycle does not always remove tungsten from the wall of the envelope which thereby darkens and reduces the luminous efficiency of the lamp. In some cases, lamps fail because of attack of the filament by the well known water cycle.

It has been determined that a small amount of oxygen, whether naturally present in internal lamp parts such as the filament or whether deliberately added as such, is necessary to accelerate the tungsten-iodine cycle and prevent darkening by removing tungsten vaporized from the filament onto the bulb wall. However, excess quantities of oxygen result in a destructive cyclic attack on the filament with resulting short life.

Figure 1:
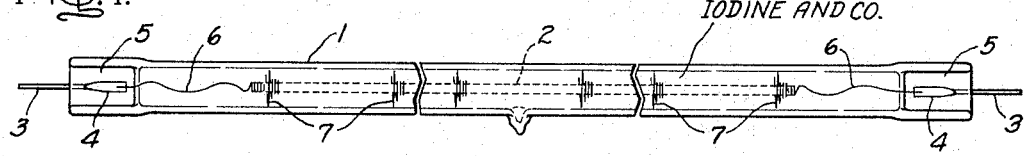
FIG. 1 is a side view of a lamp embodying the invention.

Referring now to FIG. 1 of the drawings, the lamp illustrated therein comprises a tubular envelope 1, preferably of fused quartz or equivalent transparent material of high softening point such as that known as Vycor, and which contains a longitudinally extending filament 2 of coiled tungsten wire which is electrically connected to lead-in conductors 3 having extremely thin foliated or foil portions 4 which are hermetically sealed in respective flattened pinch seals 5 at the ends of the envelope. As herein illustrated, the helically coiled filament terminates a short distance from the internal extremities of the envelope 1 and includes generally straightened leg portions 6 which extent into the respective pinch seals 5 where they are welded to respective foil portions 4 of the lead-in conductors. The filament 2 is supported by support members 7 which may be in the form of tungsten wire spirals having inner portions wound tightly on the filament coil and outer portions which are engageable with the inner envelope wall.

The envelope 1 contains a filling of inert gas such as nitrogen, argon, krypton or xenon and a small quantity of iodine and, in accordance with the invention, a low partial pressure of carbon monoxide which operates in a cyclic reaction as an oxygen transport mechanism.

It will be understood that the lamp parts are prepared to avoid or minimize the presence of impurities. For example, the filament 2 is preferably etched with a suitable acid to remove a thin surface layer thereof along with impurities such as iron and carbon, after which it is preferably heated in wet hydrogen to further remove carbon, followed by further heating in vacuum to remove oxygen. Thereby, the carbon monoxide content in the finished lamp may be accurately controlled by its addition, as such, along with the fill gas and the iodine.

In an incandescent lamp without iodine and with added CO, early failure has been shown to occur due to a $CO-CO_2-W$ cycle. This is believed to come about through a series of reactions as follows: in regions of lower temperatures away from the filament there would be the reaction $CO+CO \rightarrow CO_2+C$; at the filament, the reaction $W+CO_2 \rightarrow WO_x+CO$; and at the envelope wall the reaction $WO_x+CO \rightarrow W+CO_2$. The cycle could be stopped by freezing out $CO_2$.

It would therefore be expected that in lamps containing iodine the CO cycle would similarly cause filament attack like that attributed to the water cycle since $CO_2$ releases oxygen at the hot filament as does $H_2O$. In fact, tests of iodine-containing lamps carefully made to avoid contaminants and filled with 15 to 50 mm. Hg of CO in addition to the inert fill gas and iodine, showed that they failed in less than 50 hours. Although the lamp envelope remained clean, the filament failed by transfer of tungsten down the thermal gradient from a hotter filament coil turn to a cooler turn, resulting in thinning and burning out of a filament turn close to one of the filament supports. Thus, although the tungsten-iodine cycle was operating due to the oxygen released at the hot filament, the lamps were failing early in life by virtue of a $CO-CO_2-W$ cycle.

However, completely different results were obtained with various small amounts of CO added to the fill gas, particularly in amounts of about 0.2 to not more than 7.5 mm. Hg of CO correlated in proper relation to fill gas pressures of about 1200 to about 5000 mm. Hg.

The beneficial affects of added small amounts of CO were confirmed in a number of tests, particularly in tests with 1500 watt and 500 watt lamps of the type shown in FIG. 1 and described above. By way of additional detail, both lamp sizes had quartz envelopes 1 of about 7.75 mm. inside diameter, or approximately ⅜-inch outside diameter. The 500-watt 120-volt lamp had a length of interior of the envelope (i.e. between the seals 5) of about 3 inches and a lighted length (i.e. length of the coiled filament 2 exclusive of the straightened legs 6) of about 2⅜ inches. The 1500-watt 240-volt lamp had an interior envelope length of about 8¼ inches and a lighted length of about 6¾ inches.

Figure 2:
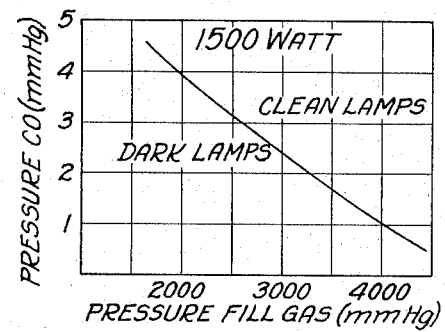
FIGS. 2 and 3 are graphs for two different lamp sizes showing amounts of carbon monoxide necessary in each case to produce clean lamps at different fill gas pressures.

For the 1500 watt lamps operating at a true filament temperature of about 3000° K., FIG. 2 shows the amount of CO necessary to maintain the lamps clear and free from blackening at different pressures of the argon fill gas. The CO content along the curve range between about 4.7 to about 0.5 mm. Hg for argon pressures ranging from about 1200 to about 5000 mm. Hg. Amounts of CO above the curve produce clean lamps whereas amounts of CO below the curve result in darkening by tungsten deposits on the envelope.

Figure 3:
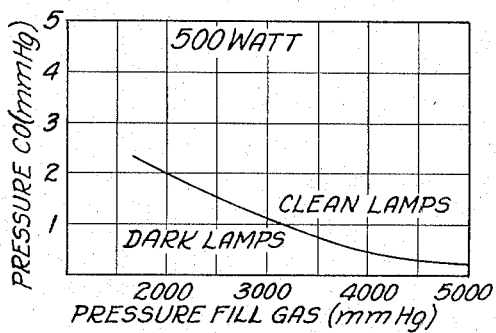

FIG. 3 shows the results obtained with the 500 watt lamps also operating at a filament temperature of about 3000° K. In this case the CO content along the curve varies between about 2.3 and 0.2 mm. Hg for argon fill pressures ranging from about 1400 to 5000 mm. Hg.

It was clearly evident from the appearance of the lamps that the carbon monoxide was controlling lamp darkening, and that the required amount of carbon monoxide decreased with increased fill gas pressure. Taking into account the finding that oxygen accelerates the regenerative iodine cycle and the effect of CO in generating oxygen, a $CO-CO_2-W$ cycle would explain the observed lamp performance.

It is believed that the explanation for the different amounts of CO required for the 1500-watt lamp of FIG. 2 and the 500-watt lamp of FIG. 3 is simply the slower generation of $CO_2$ in the longer 1500-watt lamp because the cooler "end chambers" (i.e. the end portions containing the straightened legs 6), which favor $CO_2$ generation, are a smaller fraction of total lamp volume. Thus, whereas 500-watt lamps remained clean on burning at both normal and over voltage with 2 mm. of CO, the 1500-watt lamps darkened with 2 mm. of CO and required about 3 mm. of CO to stay clean on normal burning and 4 mm. of CO on over-voltage burning.

Whereas FIGS. 2 and 3 illustrate the effect of CO content in maintaining the lamps free from blackening, they do not take into account lamp life which, as pointed out above, is severely shortened by the presence of excessive amounts of CO. Failure then is due to a heavy cycling attack with the transfer of tungsten down the thermal gradient.

Figure 4:
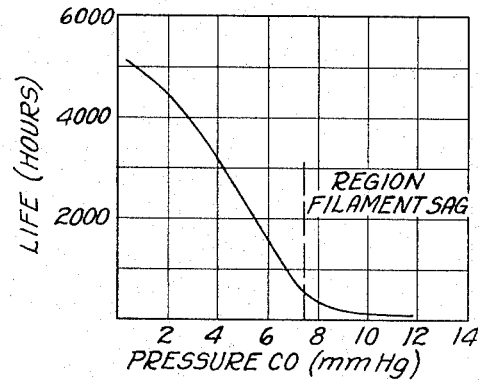
FIG. 4 is a graph showing relationship of lamp life to pressure of carbon monoxide.

The relationship of lamp life and CO content is illustrated by the curve in FIG. 4 of tests of 500-watt lamps containing about 2200 mm. Hg of argon and operating at a filament temperature of about 3000° K. It will be seen that life decreases rapidly with increasing amount of CO, and amounts of CO exceeding about 7.5 mm. Hg result in a significant sagging of the filament.

It must also be kept in mind that whereas FIG. 4 indicates that longest life would be obtained with amounts of CO as low as about 0.2 mm. Hg, FIGS. 2 and 3 show that a lamp containing such a small amount of CO with 2200 mm. Hg of argon fill gas would blacken severely and thus end its useful life in a very short time. On the other hand, large amounts of CO, even with high pressures of fill gas, produce short life by burn-out due to cycling. Actual tests have shown that for both long life and freedom from blackening, a 1500-watt lamp containing 2200 mm. Hg of argon should contain about 4 mm. Hg of CO which will result in a life of about 3200 hours (FIG. 4) with a clean bulb, as will be seen from FIG. 2. Amounts of CO as low as about 0.7 mm. Hg in such lamps have been shown to produce heavy blackening although the lamps were burned as long as about 780 hours, and 2 mm. Hg of CO produced considerably blackening although the lamps were burned to 850 hours, whereas 4.7 mm. Hg of CO produced lamps which remained clean.

It may also be mentioned that when more oxygen is present than that necessary to react with all the carbon present to form CO, the $CO-CO_2$ cycle is strongly accelerated resulting in early failure by attack of the filament and transfer of tungsten down the thermal gradient from a hotter to a cooler coil turn close to a support.

What we claim as new and desire to secure by Letters Patent of the United States is:

1. An electric incandescent lamp of the iodine-cycle type comprising a sealed radiation-transmitting envelope containing an incandesible tungsten wire filament, an inert gas filling and a quantity of iodine vapor effective to function as a regenerative getter returning vaporized tungsten from the envelope wall to said filament, means to accelerate the reaction of iodine with tungsten on the envelope wall consisting of gaseous oxygen in the form of carbon monoxide at a pressure within the range of about 0.2 to about 7.5 mm. Hg for inert gas filling pressures in the range of about 1200 to 5000 mm. Hg, the carbon monoxide being correlated to inert gas pressure to be present in decreasing amount with increasing inert gas pressure for both long life and freedom from blackening of the envelope.

References Cited

UNITED STATES PATENTS

| | | | |
|---|---|---|---|
| 1,632,647 | 6/1927 | Fonda | 313—222 X |
| 3,132,278 | 5/1964 | Collins et al. | 313—222 X |
| 3,242,372 | 3/1966 | Bonazoli et al. | 313—222 |

JAMES W. LAWRENCE, *Primary Examiner.*

S. A. SCHNEEBERGER, *Assistant Examiner.*